United States Patent [19]

Hirabayashi

[11] 4,257,547
[45] Mar. 24, 1981

[54] TAPE TRANSPORT MECHANISM

[75] Inventor: Nobuhiro Hirabayashi, Nagoya, Japan

[73] Assignee: Shin-Shirasuna Electric Corp., Nagoya, Japan

[21] Appl. No.: 8,967

[22] Filed: Feb. 2, 1979

Related U.S. Application Data

[63] Continuation-in-part of Ser. No. 791,799, Apr. 28, 1977, abandoned, which is a continuation of Ser. No. 668,737, Mar. 19, 1976, abandoned.

[30] Foreign Application Priority Data

Oct. 22, 1975 [JP] Japan .................................. 50/144011

[51] Int. Cl.³ ............................................ B65H 17/42
[52] U.S. Cl. .................................... 226/110; 226/188; 242/208
[58] Field of Search ............... 226/108, 110, 111, 188; 242/201, 206–210

[56] References Cited

U.S. PATENT DOCUMENTS

| 3,472,464 | 10/1969 | Morimoto et al. | 242/208 |
| 3,610,553 | 10/1971 | Matsuyama | 242/201 |
| 3,883,059 | 5/1975 | Nakamichi | 226/108 |
| 3,900,174 | 8/1975 | Morimoto et al. | 242/201 |

Primary Examiner—Leonard D. Christian

[57] ABSTRACT

A tape transport mechanism for dual capstan type tape recorders, which is designed so that a drive motor can be located at any desired position and rotational irregularities such as wow can most effectively be prevented. This mechanism includes a first flywheel provided with a first capstan for transporting a magnetic tape, and a second flywheel provided with a second capstan for imparting a back tension to the magnetic tape being transported. The first flywheel comprises a smaller-diameter portion on which said first capstan is provided, and a larger-diameter portion which is integrally provided on the bottom of the smaller-diameter portion. The larger-diameter portion of the first flywheel is coupled to the drive motor through a first belt, and the smaller-diameter portion thereof is connected to the second flywheel through a second belt.

2 Claims, 1 Drawing Figure

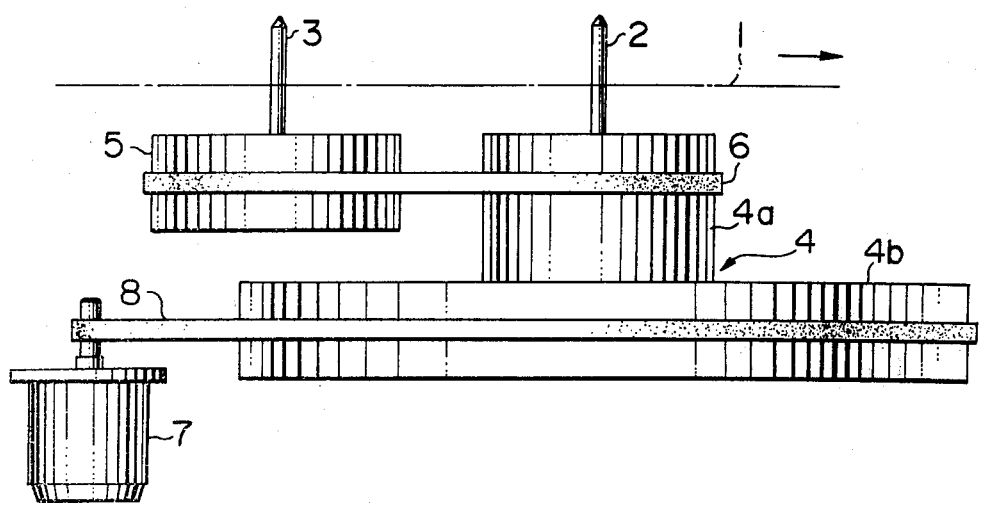

TAPE TRANSPORT MECHANISM

This application is a continuation-in-part of Ser. No. 791,799, filed Apr. 28, 1977 which is a continuation of Ser. No. 668,737, filed Mar. 19, 1976, both now abandoned.

BACKGROUND OF THE INVENTION

1. Field of the Invention

This invention relates to a tape transport mechanism for tape recorders.

2. Description of the Prior Art

In order to impart a tension to that portion of a magentic tape being transported which is contacted by a magnetic head in a tape recorder, the so-called dual capstan system has conventionally been proposed wherein a pair of flywheels each having a capstan provided thereon are disposed in juxtaposition with each other, and a rotary drive source such as electric motor is postioned with the axis of the rotary shaft thereof disposed in alignment with a line which is perpendicular to an intermediate line passing between the flywheels at right angles to the axis of each flywheel.

However, such a conventional arrangement is disadvantageous in that the freedom of design is limited due to the fact that the motor should be positioned in the manner discribed just above. Another disadvantage is such that since the positions of the capstans provided on the flywheels are predetermined, maximum sizes that the flywheels can have are restricted by the positions of the capstans, so that flywheels larger than such maximum sizes cannot be utilized.

SUMMARY OF THE INVENTION

Accordingly, it is an object of this invention to avoid the aforementioned disadvantages of the prior art.

Another object of this invention is to provide a novel and improved tape transport mechanism for tape recorders, which is free from the foregoing problems.

In the mechanism according to this invention, there are provided a first flywheel provided with a first capstan for transporting a magnetic tape, and a second flywheel provided with a second capstan for imparting a back tension to the magnetic tape while the latter is being transported. The first flywheel comprises a smaller-diameter portion on which said first capstan is provided, and a larger-diameter portion which is integrally provided on the bottom of the smaller-diameter portion. A rotary drive source such as electric motor is provided which has a rotary shaft extending in substantially parallel relationship with the axis of the larger-diameter portion of the first flywheel. The rotary shaft of the motor is coupled to the aforementioned larger-diameter portion through an endless belt. The smaller-diameter portion of the first flywheel is connected to the second flywheel through another endless belt. With such an arrangement, it is possible to locate the above-mentioned rotary drive source at any desired position as well as to effectively prevent rotational irregularities such as wow.

Other objects, features and advantages of this invention will become fully apparent from the following detailed description taken in conjunction with the accompanying drawing.

BRIEF DESCRIPTION OF THE DRAWING

The drawing is a schematic elevational side view showing the tape transport mechanism according to an embodiment of this invention.

DESCRIPTION OF THE PREFERRED EMBODIMENT

Referring to the drawing, there is illustrated an example of the tape transport mechanism of this invention, wherein a magnetic tape shown at 1 is transported in a direction indicated by an arrow or in the opposite direction, by means of a tape transport capstan 2 which is adapted to cooperate with a pinch roller (not shown). The magnetic tape 1, while being transported, is provided with a predetermined back tension by means of another capstan 3 which is also adapted to cooperate with a pinch roller (not shown). According to this embodiment of the invention, there are provided a first flywheel 4 and a second flywheel 5. The flywheel 4 comprises a smaller-diameter portion 4a and a larger-diameter portion 4b which is integrally provided on the bottom of the smaller-diameter portion 4a. The tape transport capstan 2 is provided on the smaller-diameter portion 4a of the flywheel 4 coaxially therewith, and the tension imparting capstan 3 is provided on the flywheel 5 coaxially therewith. The two capstans 2 and 3 extend in predetermined spaced parallel relationship with each other. The smaller-diameter portion 4a of the flywheel 4 is positioned substantially at the same level as the other flywheel 5, and the larger-diameter portion 4b thereof is disposed at a lower level than the flywheel 5 as viewed in the drawing. It should be noted that the larger-diameter portion 4b may be radially extended to the extent to accomplish the purposes of this invention. Preferably, the larger-diameter portion 4b has such a radius as to extend in at least partially facing relationship with that surface of the flywheel 5 which is opposite to the surface on which the capstan 3 is provided. The relationship in radius between the smaller-diameter portion 4a of the flywheel 4 and the other flywheel 5 is established so that as these flywheels are rotated, the predetermined back tension can be imparted to the magnetic tape while the latter is being transported for recording or playback. The smaller-diameter portion 4a of the flywheel 4 and the other flywheel 5 are coupled to each other through an endless drive belt 6 entrained under tension therearound. Furtermore, the larger-diameter portion 4b of the flywheel 4 is coupled to the rotary shaft of the motor 7 through another endless drive belt 8 extending under tension therebetween.

It is known that the energy of a rotating flywheel is proportional to the following:

1. The fourth power of its radius, times
2. The specific gravity of the material of which it is composed, times
3. The thickness of the flywheel.

From the foregoing it can be appreciated that the energy of a flywheel can be much more greatly increased by increasing the radius of the flywheel than by increasing the thickness or specific gravity thereof.

When utilizing conventional construction as in the prior art, difficulties are encountered in attempting to increase the diameter of one flywheel, since the physical limitations of conventional construction are such that the dimensions of the respective flywheels cannot be increased to an extent beyond the spacing between the two capstans.

According to the present invention these difficulties are effectively avoided by providing a composite flywheel as above described having a larger-diameter portion and a smaller-diameter portion, in cooperation with another flywheel. In a preferred embodiment, especially where use is made of a "Philips" type cassette, the radius of the larger-diameter portion 4b should be at least greater, preferably only slightly greater than half the spacing between the two capstans and less than about 80 mm; and the smaller-diameter portion of the composite flywheel should be equal in radius to the other flywheel but smaller than half the spacing between the capstans.

As is inherently shown in parent application Ser. No. 791,799, the larger diameter portion of the first flywheel is thus substantially greater than the diameter of the second flywheel and of substantially greater mass with respect thereto.

With the aforementioned arrangement of this invention, it is possible to provide the motor 7 at any desired position so that the freedom of design is not limited as in the prior art referred to above. Moreover, the larger-diameter portion 4b of the flywheel 4 can be adjusted to any desired size, since the same is not restricted by the positions of the capstans, and accordingly, the size of the larger-diameter portion 4b can be made as large as desired, within the practical limits of this invention, making it possible to most effectively prevent irregularities in rotation such as wow.

While this invention has been described and illustrated with respect to one specific embodiment thereof, it is to be understood that the foregoing description is only exemplary of the invention and various modifications and changes may be made therein within the spirit and scope of the invention as defined in the appended claims.

I claim:

1. A tape transport mechanism for tape recorders of the type including a first capstan for transporting a magnetic tape and a second capstan for imparting a predetermined tension to said magnetic tape, comprising:
    (a) a first flywheel consisting of a smaller-diameter portion on which said first capstan is provided substantially coaxially therewith, and a larger-diameter portion which is integrally provided on said smaller-diameter portion substantially coaxially therewith at the side opposite to said first capstan;
    (b) a second flywheel on which said second capstan is provided substantially coaxially therewith and in predetermined spaced parallel relationship with said first capstan, the upper surface of said larger-diameter portion of said first flywheel having such a radius as to extend in at least partially facing relationship with the lower surface of said second flywheel; said larger-diameter portion of said first flywheel being substantially greater than that of said second flywheel and of substantially greater mass with respect thereto;
    (c) a rotary drive source having a rotary shaft extending in substantially parallel relationship with the axis of said larger-diameter portion;
    (d) a first drive belt entrained around the rotary shaft of said rotary drive source and the larger-diameter portion of said first flywheel; and
    (e) a second drive belt entrained around said smaller-diameter portion of said first flywheel and said second flywheel.

2. A tape transport mechanism according to claim 1, wherein the radius of the larger-diameter portion of said first flywheel is greater than half the spacing between said first and second capstans and the smaller-diameter portion thereof is substantially equal in radius to said second flywheel and smaller than half the spacing between the capstans.

* * * * *